(12) United States Patent
Ou (10) Patent No.: US 9,719,540 B2
(45) Date of Patent: Aug. 1, 2017

(54) HOLLOW GROOVE PIPE STRUCTURE

(71) Applicant: Chien Tsung Ou, Ligang Township, Pingtung County (TW)

(72) Inventor: Chien Tsung Ou, Ligang Township, Pingtung County (TW)

( * ) Notice: Subject to any disclaimer, the term of this patent is extended or adjusted under 35 U.S.C. 154(b) by 0 days.

(21) Appl. No.: 15/114,391

(22) PCT Filed: Jan. 27, 2014

(86) PCT No.: PCT/CN2014/071543
§ 371 (c)(1),
(2) Date: Jul. 26, 2016

(87) PCT Pub. No.: WO2015/109591
PCT Pub. Date: Jul. 30, 2015

(65) Prior Publication Data
US 2016/0341229 A1 Nov. 24, 2016

(51) Int. Cl.
*F16B 12/02* (2006.01)
*E04B 1/61* (2006.01)
*A47B 96/14* (2006.01)
*E04B 1/24* (2006.01)
*E04C 3/04* (2006.01)

(52) U.S. Cl.
CPC .......... *F16B 12/02* (2013.01); *A47B 96/1466* (2013.01); *E04B 1/61* (2013.01);
(Continued)

(58) Field of Classification Search
CPC ......... Y10T 403/4662; Y10T 403/4677; Y10T 403/4671; Y10T 403/4682;
(Continued)

(56) References Cited

U.S. PATENT DOCUMENTS 5,192,145 A * 3/1993 Rixen ..................... F16B 7/187
403/187
5,729,948 A * 3/1998 Levy ..................... E04B 1/2604
297/153
(Continued)

FOREIGN PATENT DOCUMENTS

CN 200982517 Y 11/2007
DE 3513382 A1 10/1986
(Continued)

*Primary Examiner* — Daniel Wiley
(74) *Attorney, Agent, or Firm* — Idea Intellectual Limited; Margaret A. Burke; Sam T. Yip (57) ABSTRACT

A hollow groove pipe structure is disclosed and includes a hollow groove pipe, first fixing sliding members, second fixing sliding members, and fixing members. The hollow groove pipe has a first surface, a second surface, a third surface, and a fourth surface for surrounding a hollow space. At least two opposite surfaces have grooves, and the bottoms of the grooves are greater (wider) than the opening and provided with trough holes. The plates having a plurality of protruding portions can be clamped in the grooves. The first and second fixing sliding members having protruding portions surround and clamp the plates with the space between the two through holes of the grooves, such that the fixing members pass through the holes of the first fixing sliding member, and the holes of the groove the holes of the second fixing sliding member fix and combine the plates into a whole.

4 Claims, 8 Drawing Sheets

(52) U.S. Cl.
CPC ............. *A47B 2230/0077* (2013.01); *E04B 2001/2481* (2013.01); *E04B 2001/6195* (2013.01); *E04C 2003/0421* (2013.01); *E04C 2003/0439* (2013.01); *E04C 2003/0456* (2013.01); *E04C 2003/0465* (2013.01)

(58) Field of Classification Search
CPC .. Y10T 403/7094; F16B 7/187; F16B 37/045; E04B 1/185; E04C 2003/0465; E04C 2003/0421
See application file for complete search history.

(56) References Cited

U.S. PATENT DOCUMENTS

| | | | | |
|---|---|---|---|---|
| 5,746,535 A | * | 5/1998 | Kohler | A47B 47/0041 403/230 |
| 6,712,540 B2 | * | 3/2004 | Schmalzhofer | F16B 7/187 403/248 |
| 6,712,543 B1 | * | 3/2004 | Schmalzhofer | F16B 7/187 403/187 |
| 6,808,334 B2 | * | 10/2004 | Nicoletti | A47B 57/565 403/169 |
| 7,096,641 B2 | * | 8/2006 | Birnbaum | E04C 3/07 428/595 |
| 8,882,083 B2 | * | 11/2014 | Ramskov | E04G 21/3223 256/65.01 |
| 2005/0002729 A1 | * | 1/2005 | Nicoletti | F16B 7/187 403/253 |

FOREIGN PATENT DOCUMENTS

| | | | | |
|---|---|---|---|---|
| FR | 2643700 A1 | | 8/1990 | |
| FR | WO 9500727 A1 | * | 1/1995 | ............ E04C 3/06 |

* cited by examiner

HOLLOW GROOVE PIPE STRUCTURE

BACKGROUND OF THE INVENTION

1. Field of the Invention

The present invention generally relates to a pipe structure, and more specifically to a hollow groove pipe structure having a hollow groove pipe with long grooves along a longitudinal axis for accommodating protruding portions of plates, each groove having an opening and a bottom greater (wider) than the opening, each of the protruding portion clamped by two fixing and sliding members slid into the groove, a plurality of fixing members used to secure and fix the fixing and sliding members for combining the hollow groove pipe structure and the plates into a whole.

2. The Prior Arts

In the prior arts, angle iron or steel provided with holes and having an appropriate size and weight is often employed to construct a frame, which is combined with the support plates to form a rack or shelf for specific purpose like demonstrating products. Additionally, larger angle iron or steel can be used to construct a frame for a simple building like a hut. One advantage is that angle iron or steel is easily to secure and assemble with traditional screws by hand, and also reassembled to form a new frame for recycling and reusing.

For a large scale structure or a specific frame for heavy load, C-shaped steel with enhanced strength is usually needed, or even two pieces of C-shaped steel are welded to form a column or post with a closed rectangular cross section, served as a primary element. However, C-shaped steel is not provided with any through hole for securing by the screw, and only the welding process is used for joint. Obviously, the shortcoming is that C-shaped steel fails to recycle or reuse to construct a new frame.

Two crossover pieces of C-shaped steel to be welded together needs special joint members such as bridge connector. The bridge connector has a C-shaped protruding shape at the middle portion for accommodating a lateral pipe, and two side of the bridge connector horizontally extend to attach a longitudinal pipe. The lateral pipe and the longitudinal pipe are welded to the bridge connector to form a cross shape. The shortcoming is that the C-shaped protruding shape of the bridge connector damages integrity of the whole surface and results in grid protrusions, which adversely influence the subsequent process of positioning the plates. For instance, a wooden slab serving as the plate has to be cut into smaller pieces to fit the grid protrusions, leading to inconvenience and poor sense of beauty for appearance, particularly for floor, external wall, indoor wall, and ceiling. Furthermore, welding strength between two planar structures or two vertical structures is usually not sufficient such that the whole frame is easily damaged to pieces due to abrupt horizontal shear force like earthquake. As a result, safety for human is badly affected.

Therefore, it is greatly needed to provide a new hollow groove pipe structure having trapezoidal grooves for accommodating the corresponding protruding portions of two plates to combine into a whole with the fixing members so as to maintain integrity of the surface of each plate, easily construct a complex body, and greatly enhance mechanical strength, thereby overcoming the above problems in the prior arts.

SUMMARY OF THE INVENTION

The primary object of the present invention is to provide a hollow groove pipe structure comprising a hollow groove pipe, a plurality of first fixing sliding members, a plurality of second fixing sliding members, and a plurality of fixing members for combining at least two plates with a plurality of protruding portions into a whole. The hollow groove pipe has four sides sequentially connected in a longitudinal axis for enclosing a hollow space, and at least two opposite ones of the four sides are provided with a first groove and a second groove, respectively. Each of the first and second grooves has an opening and a bottom greater (wider) than the opening, and each of the bottoms of the first and second grooves has at least two through holes, wherein the though holes of the first groove are aligned to the though holes of the second groove.

Specifically, the protruding portion of one plate is slid into, accommodated in the first groove, and clamped between the two through holes of the first groove by two fixing sliding members with two protruding portions, and the protruding portion of another plate is similarly slid into, accommodated in the second groove, and clamped between the two through holes of the second groove by another two fixing sliding members with two protruding portion. Additionally, each of the fixing sliding members has a through hole, which is aligned to the through hole of the first groove and the through hole of the second groove. Thus, a fixing member is employed to pass through the through hole of the first fixing sliding member, the through hole of the first groove, the through hole of the second groove, and the through hole of the second fixing sliding member for securing and combining with the plates into a whole.

Preferably, the hollow groove pipe is made of a metal material like titanium alloy, aluminum alloy, iron, stainless steel, zinc plated iron or zinc plated stainless steel, the first and second fixing sliding members are made of another metal material or a plastic material, and the fixing member is a screw, an expansion screw or a bolt.

Therefore, each of the two grooves of the hollow groove pipe of the present invention can be used to accommodate the protruding portion of the plate, two fixing sliding members are further employed to clamp the plate in the groove, and the fixing member passes through the two fixing sliding members and the hollow groove pipe so as to fix and combine the plates into a whole. Particularly, the hollow groove pipe, the fixing sliding members and the fixing members are assembled by a simple mechanical manner without any chemical compound like formaldehyde solvent or adhesive so as to completely avoid air pollution. The present invention is suitable to construct an indoor wall for creating isolated partitions, an outdoor wall for the building, a shelf or fence structure. In addition, the hollow groove pipe structure of the present invention is easy to disassemble, recycle and reuse so as to reassemble a new construction like a shelf or rack with appropriate size and shape based on the actual requirements, thereby achieving environmental features of energy saving and carbon reduction.

BRIEF DESCRIPTION OF THE DRAWINGS

The present invention will be apparent to those skilled in the art by reading the following detailed description of a preferred embodiment thereof, with reference to the attached drawings, in which.

DETAILED DESCRIPTION OF THE PREFERRED EMBODIMENT

The accompanying drawings are included to provide a further understanding of the invention, and are incorporated in and constitute a part of this specification. The drawings illustrate embodiments of the invention and, together with the description, serve to explain the principles of the invention.

Figure 1:
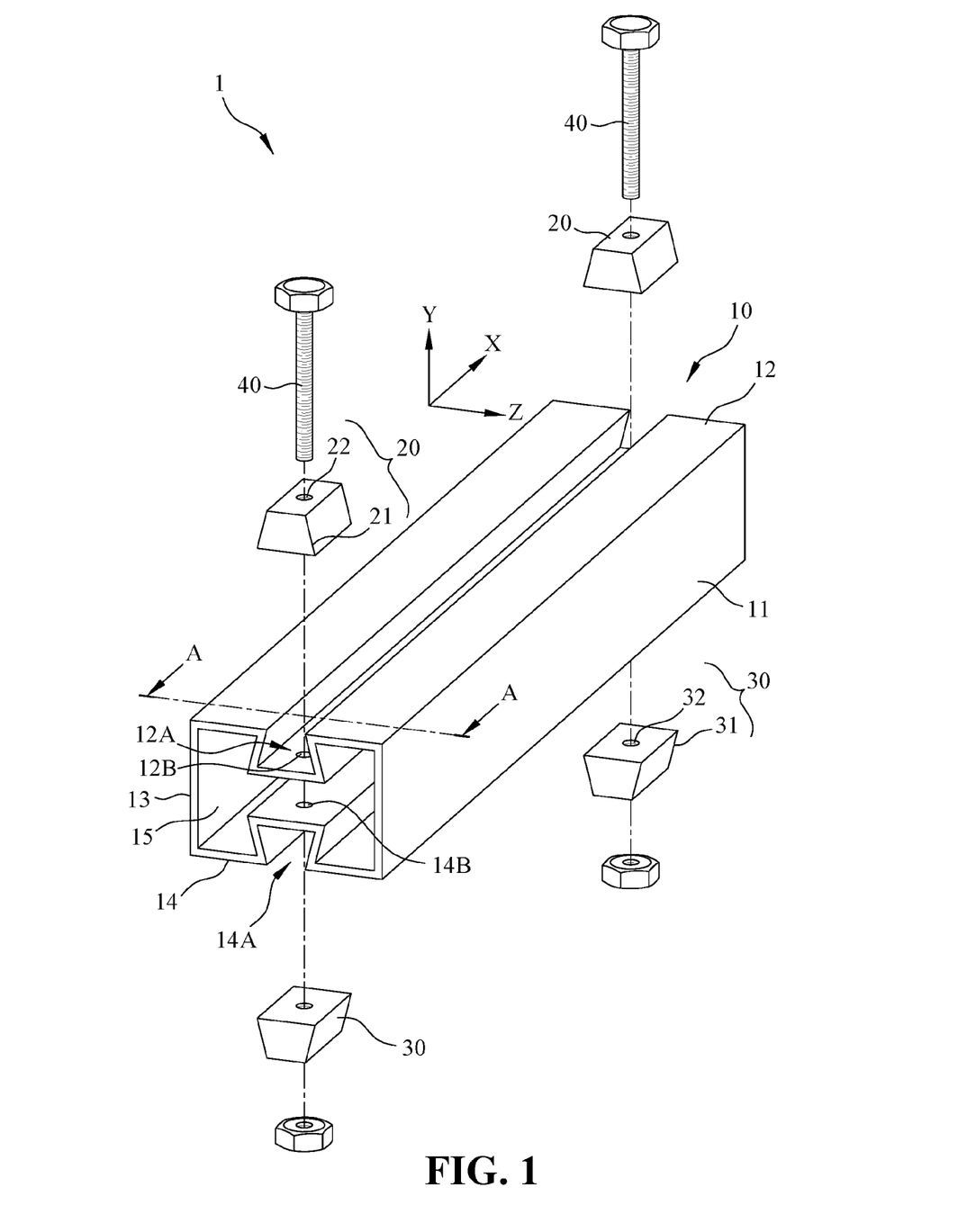
FIG. 1 is a perspective view showing the hollow groove pipe structure according to the first embodiment of the present invention.

Please refer to FIG. 1 for illustrating a perspective view showing the hollow groove pipe structure according to the first embodiment of the present invention. As shown in FIG. 1, the hollow groove pipe structure 1 of the first embodiment generally comprises a hollow groove pipe 10, two first fixing sliding members 20, two second fixing sliding members 30, and two fixing members 40 for combining together into a whole.

Specifically, the hollow groove pipe 10 has a first surface 11, a second surface 12, a third surface 13, and a fourth surface 14, which are sequentially connected and extend along a longitudinal axis X for surrounding a hollow space 15. The first surface 11 and the third surface 13 like the right and left-hand side surfaces are opposite and smooth, and the second surface 12 and the fourth surface 14 like the top and bottom side surfaces are opposite and provided with a first groove 12A and a second groove 14A along the longitudinal axis X, respectively. Each of the first groove 12A and the second groove 14A is provided with a shape of trapezoid, which has an opening and a bottom greater (wider) than the opening. Also, the bottom of the first groove 12A has at least two through holes 12B, the bottom of the second groove 14A has at least two through holes 14B, and each through hole 12B is aligned to the corresponding through hole 14B.

Each of the first fixing sliding members 20 is provided with a protruding portion 21 for fitting and being accommodated in the first groove 12A, the protruding portion 21 has a through hole 22. Similarly, each of the second fixing sliding members 30 is provided with a protruding portion 31 for fitting and being accommodated in the second groove 14A, the protruding portion 31 has a through hole 32. In particular, the through hole 22 of the first fixing sliding member 20, the through hole 12B of the first groove 12A, the through hole 14B of the second groove 14A, and the through hole 32 of the second fixing sliding member 30 are aligned for the fixing member 40 to pass through and combine the first fixing sliding member 20, the hollow groove pipe 10, and the second fixing sliding member 30.

Figure 2:
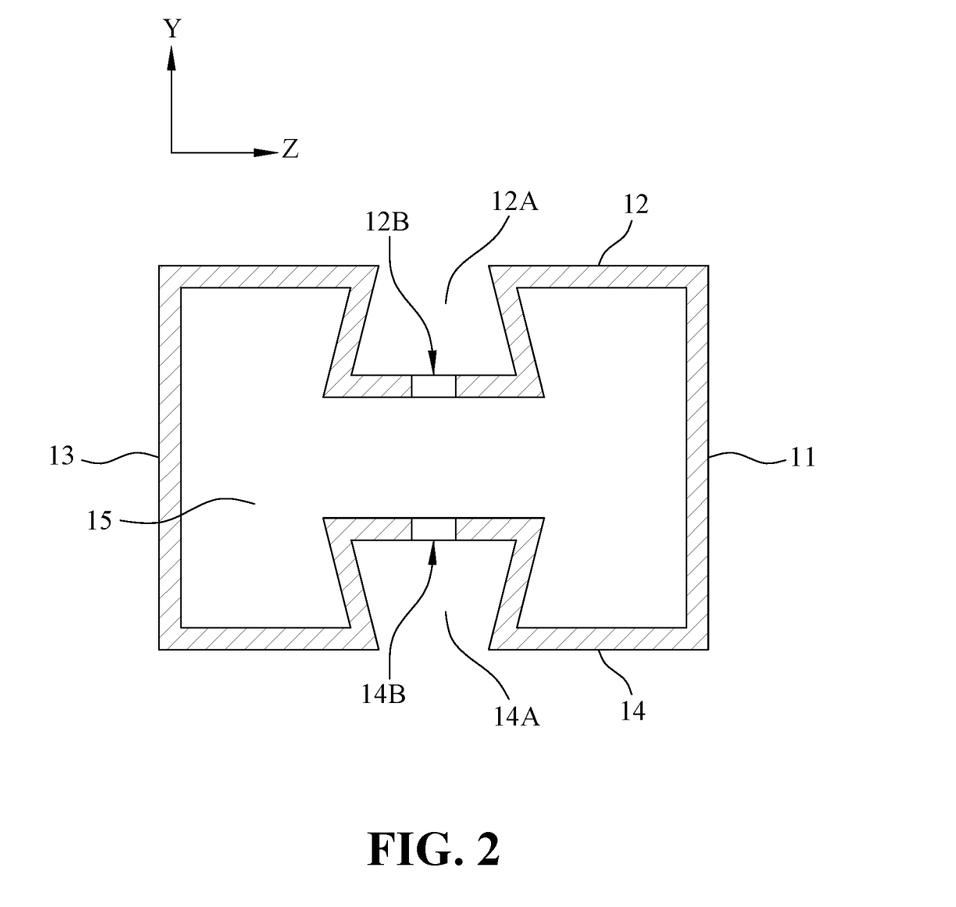
FIG. 2 is a side view showing the hollow groove pipe along the cut line A-A in FIG. 1.

To further describe the features of the hollow groove pipe structure of the first embodiment, please refer to FIG. 2 showing the side view along the cut line A-A, which illustrates the hollow groove pipe 10 in a plane defined by the first lateral axis Y and the second lateral axis Z. For example, the through hole 12B of the first groove 12A is aligned to the through hole 14B of the second groove 14A, and each of the first groove 12A and the second groove 14A has a shape of trapezoid.

The above hollow groove pipe 10 is preferably made of a metal material comprising titanium alloy, aluminum alloy, iron, stainless steel, zinc plated iron or zinc plated stainless steel, the first fixing sliding member 20 and the second fixing sliding member 30 are made of another metal material or a plastic material, and the fixing member 40 is a screw, an expansion screw or a bolt.

Figure 3:
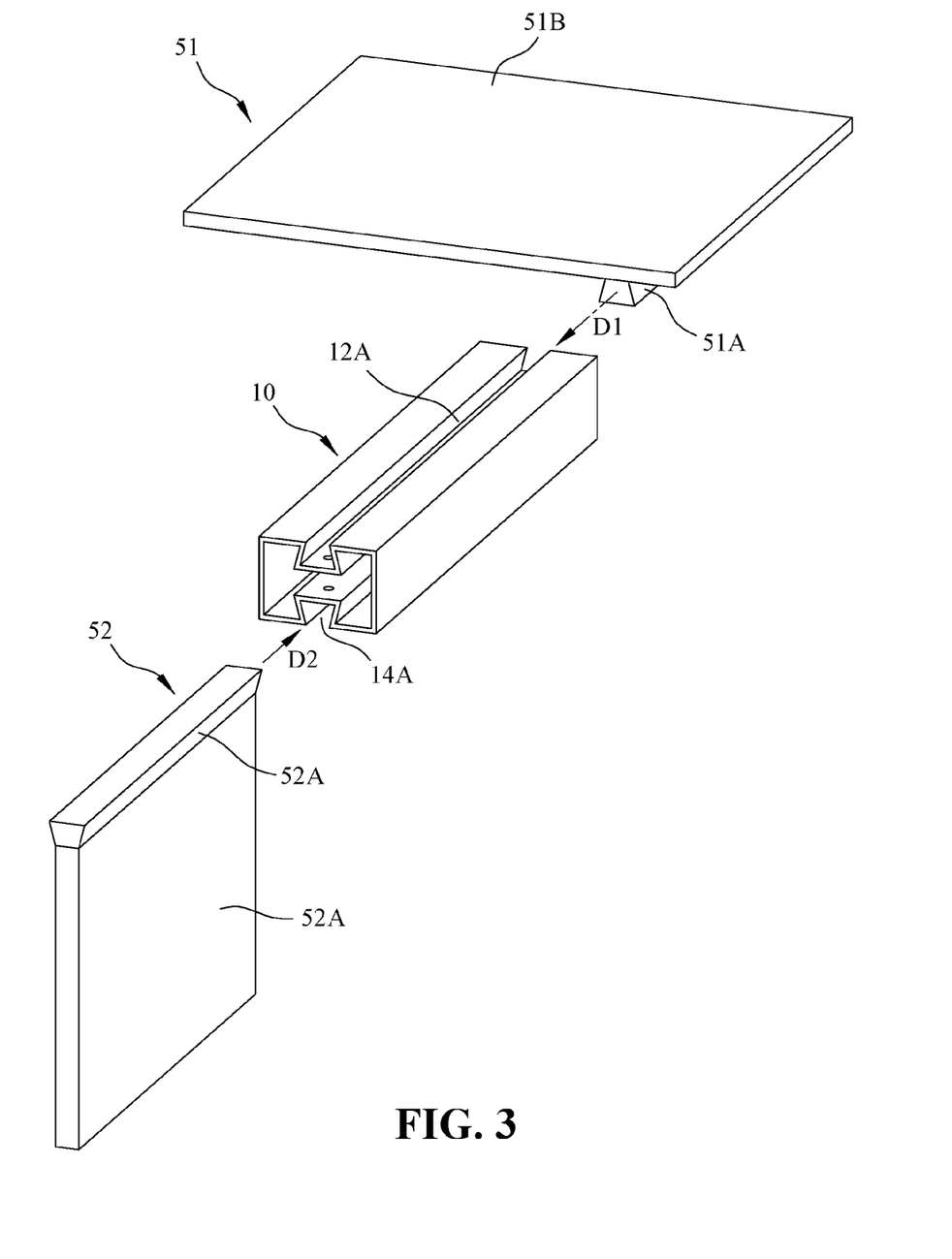
FIGS. 3 and 4 show a typical example of the hollow groove pipe structure of the first embodiment.
Figure 4:
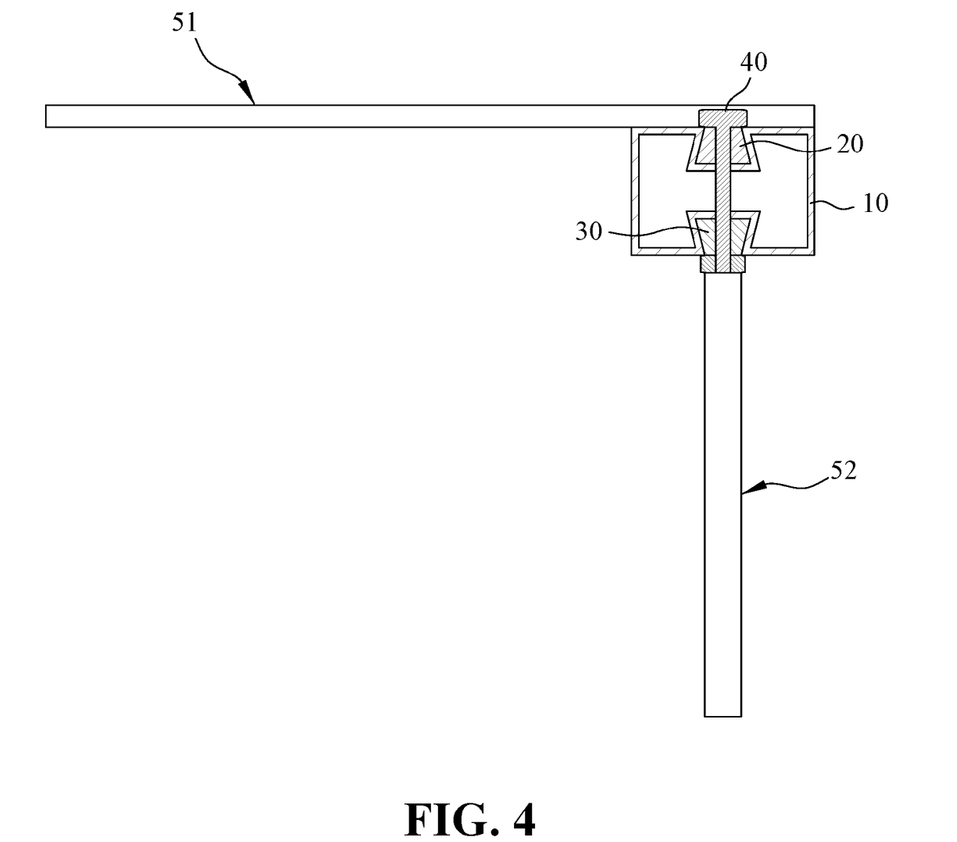

Refer to FIGS. 3 and 4 illustrating one typical example of the hollow groove pipe structure of the first embodiment. FIG. 3 shows that the first plate 51 and the second plate 52 are configured to be slid into and accommodated in the first groove 12A and the second groove 14A of the hollow groove pipe 10, respectively, and FIG. 4 shows that the fixing member 40 passes through and combine the first fixing sliding member 20, the hollow groove pipe 10, and the second fixing sliding member 30 into a whole.

In FIG. 3, the first plate 51 comprises a protruding portion 51A and a slab body 51B, wherein the protruding portion 51A vertically protrudes and the slab body 51B laterally extends. The second plate 52 comprises a protruding portion 52A and a slab body 52B, wherein the protruding portion 52A vertically protrudes and the slab body 52B vertically extends. For instance, the first plate 51 and the second plate 52 are wooden, plastic or iron slabs, and the first groove 12A and the second groove 14A are intended to accommodate the protruding portions 51A and 52A, respectively. Thus, the protruding portion 51A of the first plate 51 is slid into the first groove 12A along the direction D1, and the protruding portion 52A of the second plate 52 is slid into the second groove 14A along the direction D2. As a result, the slab body 51B laterally extending is combined with the slab body 52B vertically extending, and the first plate 51 and the second plate 52 form a frame with two surfaces configured vertical to each other as shown in FIG. 4 so as to combine one horizontal piece like the first plate 51 and one vertical piece like the second plate 52.

Figure 5:
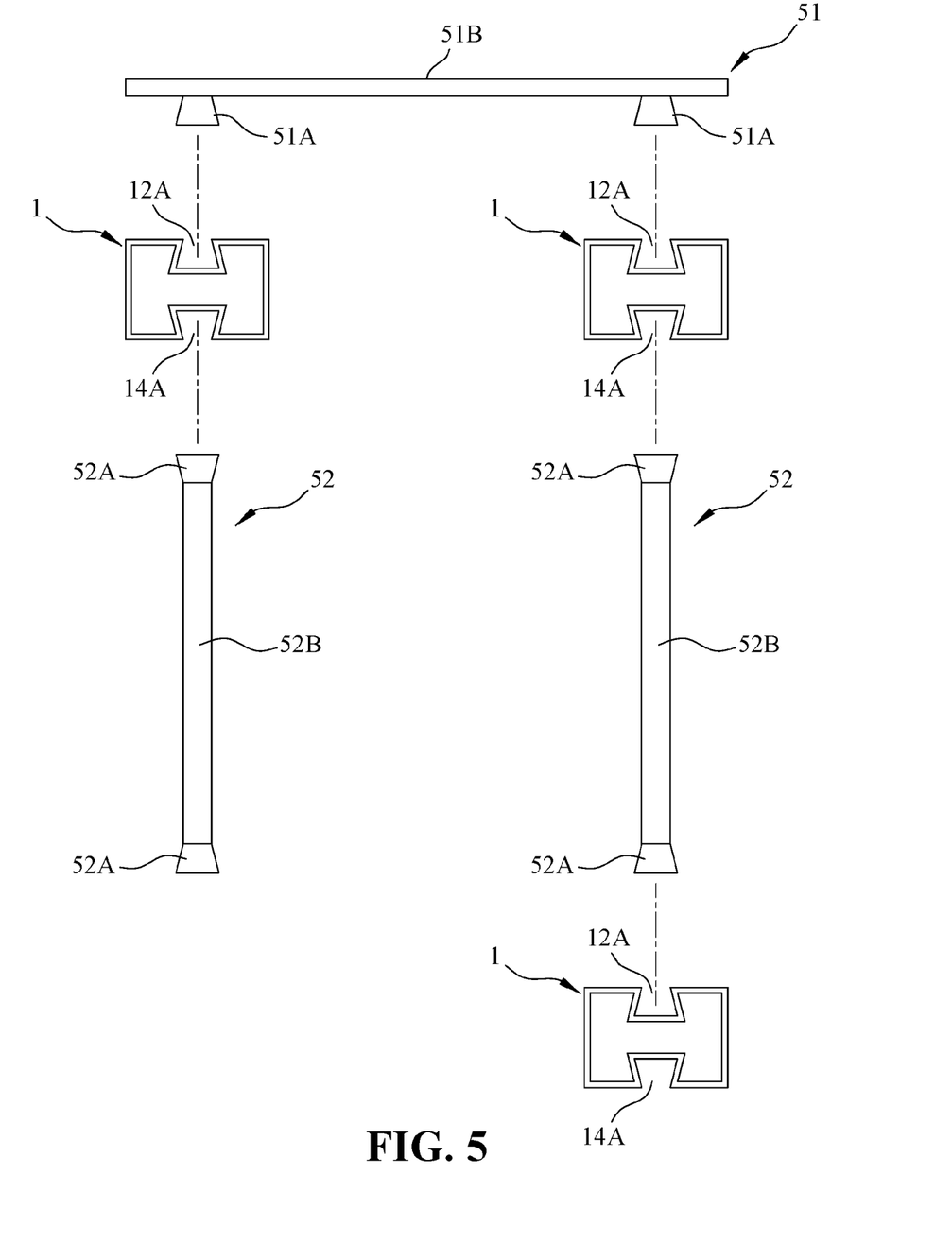
FIG. 5 shows another example of the hollow groove pipe structure of the first embodiment.

Further refer to FIG. 5 showing another example of the hollow groove pipe structure of the first embodiment, which comprises one first plate 51 and two second plates 52. The first plate 51 is provided with a plurality of protruding portions 51A and one horizontal slab body 51B, and each of the second plates 52 has two protruding portions 52A and one vertical slab body 52B such that the first plate 51 and the second plates 52 are joint through clamping and securing by two hollow groove pipe structures 1 of the first embodiment, respectively, to form a specific skeleton with separate partitions. The resultant skeleton is suitable for a shelf or a rack. The first plate 51 horizontally extending is used to support and accommodate any object, or stuff and the second plates 52 vertically extending serve as a support column. Particularly, the structure of the present invention is easy to disassemble and reassemble for reusing so as to reconstruct a new skeleton with different size and shape based on the actual requirements.

Figure 6:
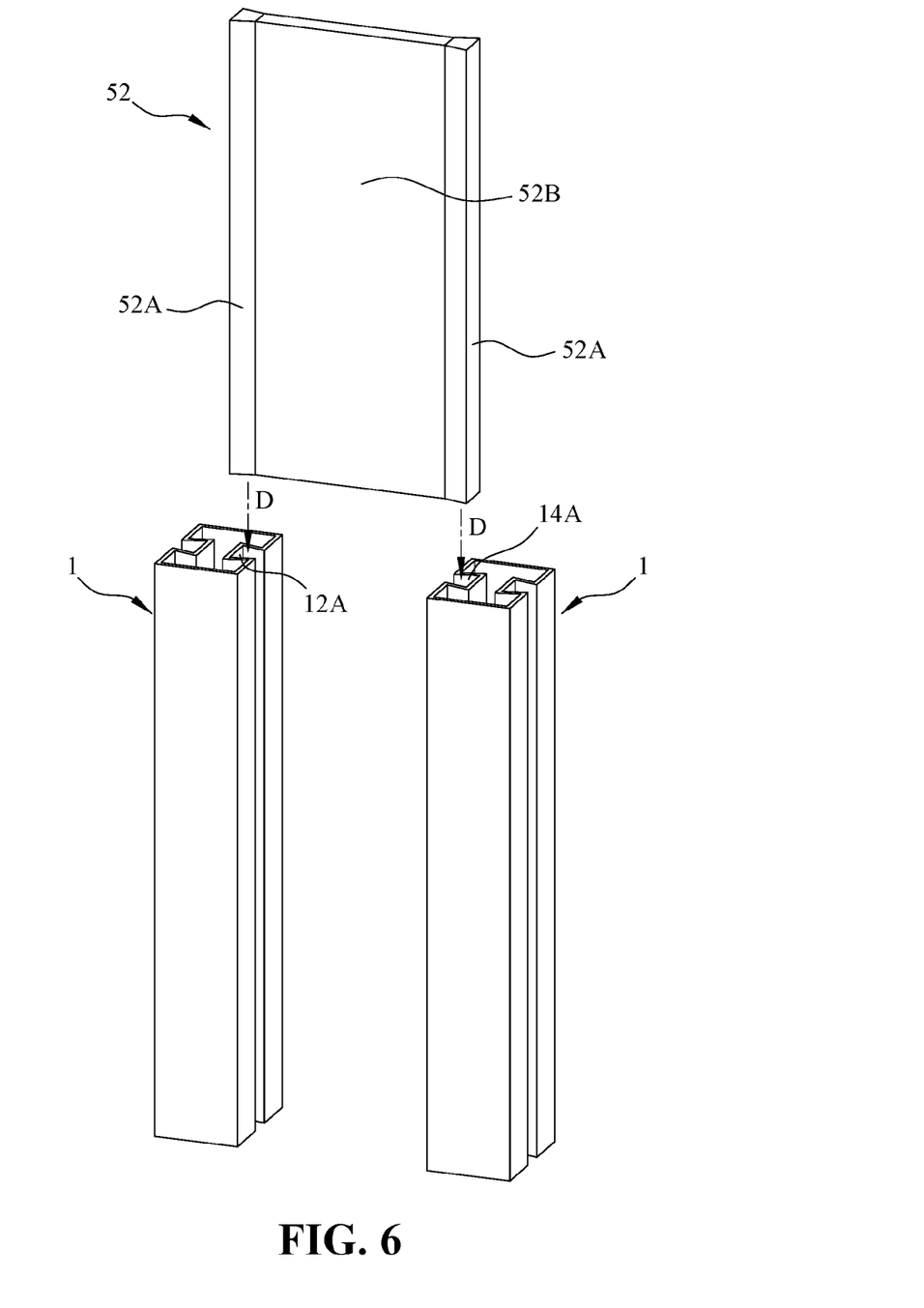
FIG. 6 shows a yet example of the hollow groove pipe structure of the first embodiment.

Refer to FIG. 6, a perspective view illustrating a yet example of the hollow groove pipe structure of the first embodiment. One of the two protruding portions 52A of the second plate 52 can be configured for sliding into the first groove 12A of the left-hand hollow groove pipe structure 1, and the other protruding portion 52A slides into the second groove 14A of the right-hand hollow groove pipe structure 1, as shown by the direction D. In addition, the first groove 12A of the right-hand hollow groove pipe structure 1 and the second groove 14A of the left-hand hollow groove pipe structure 1 can be used to joint another two second plates 52, respectively, The two protruding portions 52A of the second plate 52 can be horizontally configured for sliding into the first groove 12A and the second groove 14A of two hollow groove pipe structures 1 of the present invention. In this way, it is easy to construct a large vertical wall or a huge horizontal support plane.

Figure 7:
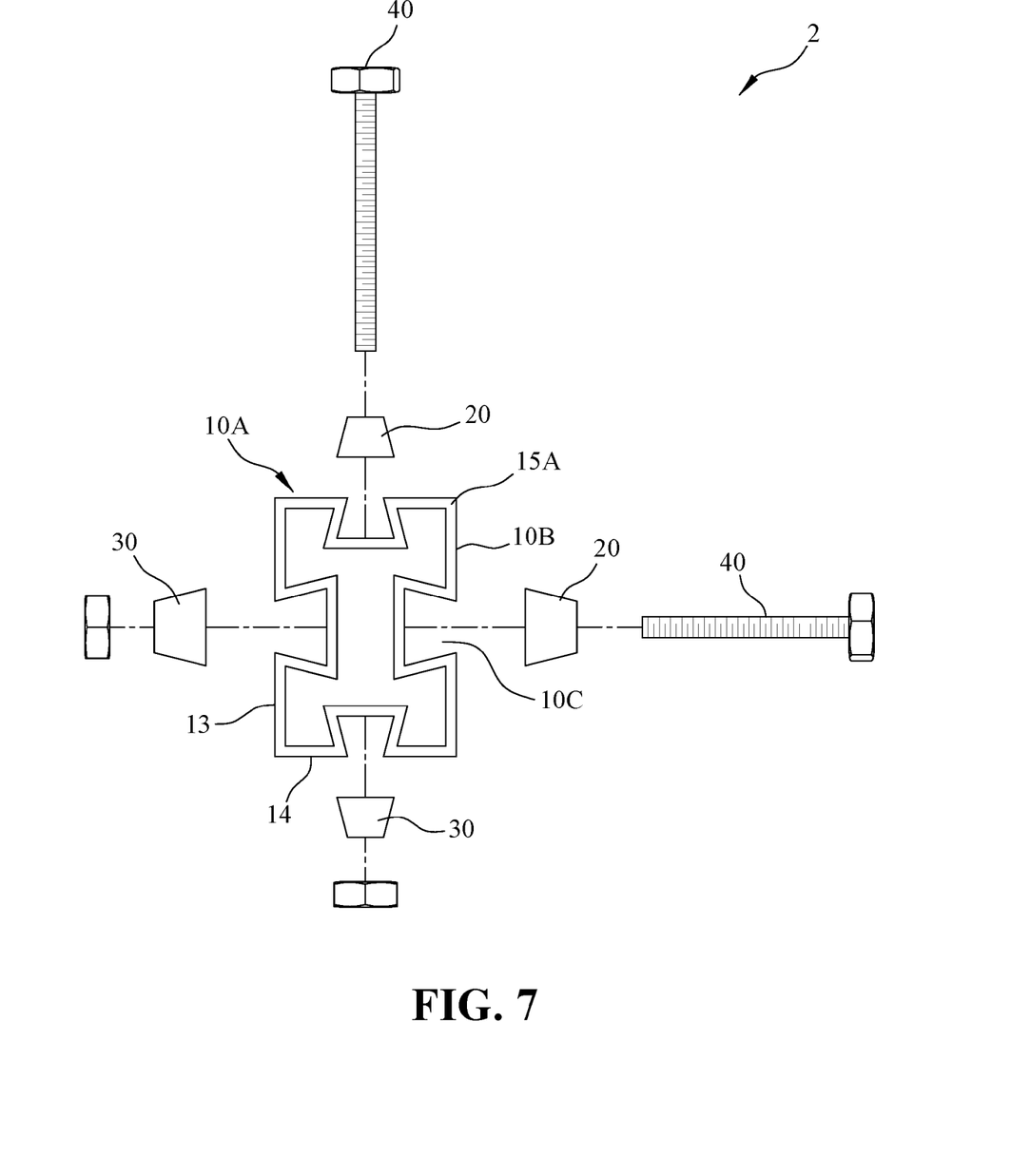
FIG. 7 is a side view showing the hollow groove pipe structure according to the second embodiment of the present invention.

Further refer to FIG. 7, a side view showing the hollow groove pipe structure according to the second embodiment of the present invention. The hollow groove pipe structure 2 of the second embodiment comprises a hollow groove pipe 10A, four first fixing sliding members 20, four two second fixing sliding members 30, and two fixing members 40 for combining together into a whole. It should be noted that only two first fixing sliding members 20, two second fixing sliding members 30, and two fixing members 40 are shown in FIG. 7.

The hollow groove pipe 10A comprises four sides 10B for enclosing a hollow space 15A, and each side 10B is provided with a groove 10C. Specifically, the groove 10C of the side 10B is similar to the first groove 12A or the second groove 14A of the first embodiment, the first fixing sliding members 20, the second fixing sliding members 30, and the fixing members 40 are also similar to the first embodiment, and thus the detailed description is omitted hereinafter.

Figure 8:
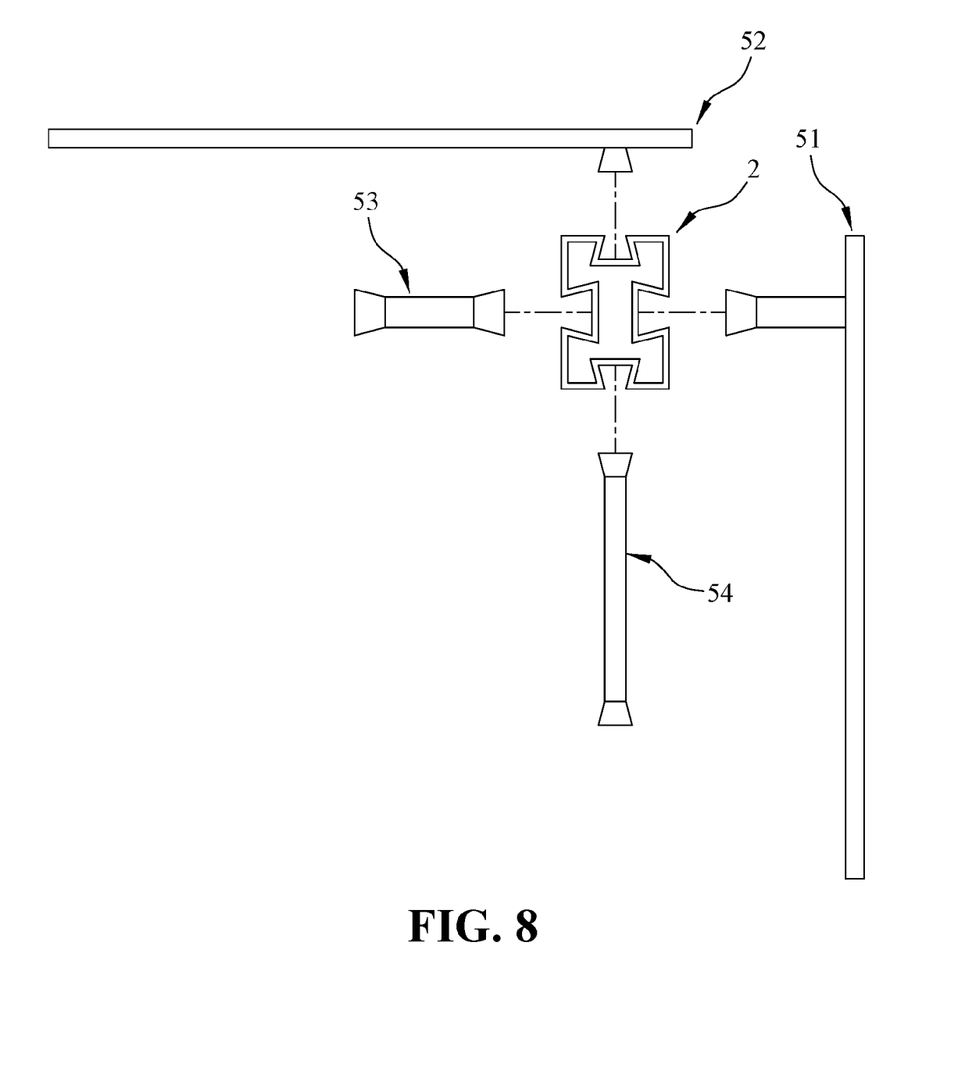
FIG. 8 is a typical example of the hollow groove pipe structure of the second embodiment.

Please refer to FIG. 8 showing a typical example of the hollow groove pipe structure of the second embodiment. The grooves 10C of the hollow groove pipe 10A are employed to joint the first plate 51, the second plate 52, the third plate 53, and the fourth plate 54 into a whole. In particular, the first plate 51, the second plate 52, the third plate 53, and the fourth plate 54 can be vertically or horizontally configured to construct a huge and complex three-dimensional body.

As mentioned above, one of the key features of the hollow groove pipe structure according to the present invention is that each of the two opposite surfaces or sides of the hollow groove pipe has a long trapezoidal groove for fitting and accommodating the protruding portion of the plate, and the groove is provided with at least two through holes such that the plate in the groove is clamped between the two through holes with two fixing sliding members. Further, two fixing members pass through the through holes of the grooves and the fixing sliding members to combine and secure the plate into a whole. Since the fixing members are easy to loosen to disassemble the hollow groove pipes, the fixing sliding members and the plates, a new construction can be assembled by the disassembled fixing members, hollow groove pipes, fixing sliding members and the plates, thereby achieving environmental features of energy saving and carbon reduction.

Moreover, the through holes of the groove can be configured at appropriate locations based on the actual size of the plate to tightly clamp the plate with the fixing sliding members, thereby increasing flexibility in the application. The plate can be a horizontal or vertical slab, and two of such a plate can be constructed to form a body with two sides vertical to each other.

Another aspect of the present invention is that each of the four sides of the hollow groove pipe is provided with a groove for accommodate one plate having at least two protruding portions, and four plates are combined into a whole by use of the hollow groove pipe. Therefore, a huge and complex three-dimensional body with separate partitions is easily constructed by jointing a plurality of plates.

Although the present invention has been described with reference to the preferred embodiments thereof, it is apparent to those skilled in the art that a variety of modifications and changes may be made without departing from the scope of the present invention which is intended to be defined by the appended claims.

What is claimed is:

1. A hollow groove pipe structure for combining and fixing at least one of a first plate and a second plate, each of the first and second plates having a protruding portion, comprising:
    a hollow groove pipe having a first surface, a second surface, a third surface, and a fourth surface sequentially connected and extending along a longitudinal axis for surrounding a hollow space, the first and third surfaces configured opposite and smooth, the second surface with a first groove and the fourth surface with a second groove configured as two opposite surfaces, the first groove and the second groove configured to accommodate the first plate and the second plate, respectively, each of the first and second grooves having an opening and a bottom wider than the opening, and being provided with at least two through holes;
    two first fixing sliding members, each provided with a protruding portion for fitting and being accommodated in the first groove, the protruding portion having a through hole;
    two second fixing sliding members, each provided with a protruding portion for fitting and being accommodated in the second groove, the protruding portion having a through hole; and
    two fixing members,
    wherein the protruding portions of the first plate and/or the second plate are clamped between the two through holes of the first groove and the second groove, respectively, the two first fixing sliding members are slid into and accommodated in the first groove of the second surface, the two second fixing sliding members are slid into and accommodated in the second groove of the fourth surface, the through hole of the first fixing sliding member is aligned to the through hole of the first groove, the through hole of the second fixing sliding member is aligned to the through hole of the second groove, each fixing member passes the through hole of the first fixing sliding member, the through hole of the first groove, the through hole of the second groove, and the through hole of the second fixing sliding member for securing to combine the first and second plates into a whole.

2. The hollow groove pipe structure as claimed in claim 1, wherein the hollow groove pipe is made of a metal material comprising titanium alloy, aluminum alloy, iron, stainless steel, zinc plated iron or zinc plated stainless steel, the first and second fixing sliding members are made of another metal material or a plastic material, and the fixing member is a screw, an expansion screw or a bolt.

3. A hollow groove pipe structure for combining and fixing at least one of a first plate, a second plate, a third plate, and a fourth plate, each of the first, second, third, and fourth plates having a protruding portion, comprising:
    a hollow groove pipe having a first surface, a second surface, a third surface, and a fourth surface sequentially connected and extending along a longitudinal axis for surrounding a hollow space, the first, second, third, and fourth surfaces provided with a first groove, a second groove, a third groove, and a fourth groove, respectively, the first, second, third, and fourth grooves being for accommodating the first, second, third, and fourth plates, respectively, each of the first, second, third, and fourth grooves having an opening and a bottom wider than the opening, and being provided with at least two through holes;

two first fixing sliding members, each provided with a protruding portion for fitting and being accommodated in the first groove, the protruding portion having a through hole;

two second fixing sliding members, each provided with a protruding portion for fitting and being accommodated in the second groove, the protruding portion having a through hole;

two third fixing sliding members, each provided with a protruding portion for fitting and being accommodated in the third groove, the protruding portion having a through hole;

two fourth fixing sliding members, each provided with a protruding portion for fitting and being accommodated in the fourth groove, the protruding portion having a through hole; and four fixing members, wherein the protruding portions of the first, second, third, and fourth plates are clamped between the two through holes of the first, second, third, and fourth grooves, respectively, the first, second, third, and fourth fixing sliding members are slid into and accommodated in the first, second, third, and fourth grooves, respectively, the through hole of the first fixing sliding member is aligned to the through hole of the first groove, the through hole of the second fixing sliding member is aligned to the through hole of the second groove, the through hole of the third fixing sliding member is aligned to the through hole of the third groove, the through hole of the fourth fixing sliding member is aligned to the through hole of the fourth groove, each fixing member passes the through hole of the first fixing sliding member, the through hole of the first groove, the through hole of the third groove, and the through hole of the third fixing sliding member, or the through hole of the second fixing sliding member, the through hole of the second groove, the through hole of the fourth groove, and the through hole of the fourth fixing sliding member so as to combine the first, second, third, and fourth plates into a whole.

4. The hollow groove pipe structure as claimed in claim 3, wherein the hollow groove pipe is made of a metal material comprising titanium alloy, aluminum alloy, iron, stainless steel, zinc plated iron or zinc plated stainless steel, the first and second fixing sliding members are made of another metal material or a plastic material, and the fixing member is a screw, an expansion screw or a bolt.

* * * * *